United States Patent [19]

Frank

[11] Patent Number: 4,611,556

[45] Date of Patent: Sep. 16, 1986

[54] CAT SCRATCHING POST AND DOOR HANGING ASSEMBLY

[76] Inventor: Lawrence Frank, 784 Columbus Ave. 17J, New York, N.Y. 10025

[21] Appl. No.: 734,601

[22] Filed: May 16, 1985

[51] Int. Cl.$^4$ .............................................. A01K 29/00
[52] U.S. Cl. .................................... 119/29; 248/309.2
[58] Field of Search ................. 119/29, 26; 248/309.2, 248/360, DIG. 5; 211/16, 48; 40/331; 242/55.42, 106, 129.6; 446/227

[56] References Cited

U.S. PATENT DOCUMENTS

| | | | |
|---|---|---|---|
| 1,202,190 | 10/1916 | Kern | 211/16 X |
| 2,731,229 | 1/1956 | Seitz | 248/309.2 X |
| 2,894,487 | 7/1959 | Goldon | 119/1 |
| 2,909,590 | 10/1959 | Stanley | 242/129.6 X |
| 2,997,019 | 8/1961 | Bryson | 119/29 |
| 3,085,551 | 4/1963 | Helmer | 119/29.5 |
| 3,115,376 | 12/1963 | Cupo | 248/309.2 X |
| 3,370,805 | 2/1968 | Barbee | 248/309.2 X |
| 3,604,397 | 9/1971 | Salerno | 119/29 |
| 3,916,838 | 11/1975 | Swart | 119/29 |
| 3,993,027 | 11/1976 | Mullin | 119/1 |
| 4,009,686 | 3/1977 | Gilchrist | 119/26 |
| 4,344,583 | 8/1982 | Drum | 242/129.6 X |
| 4,539,936 | 9/1985 | Majewski | 119/29 |

Primary Examiner—Robert P. Swiatek
Attorney, Agent, or Firm—Shlesinger, Arkwright, Garvey & Fado

[57] ABSTRACT

A scratching post assembly for pets comprising a generally C-shaped mounting bracket including a longitudinally extending main body portion and top and bottom flanges extending at approximately right angles from the main body portion, the top and bottom flanges each including an aperture formed therein, an elongated mounting rod including a stop element attached to one end thereof, the mounting rod extending through the flange apertures with the stop element resting upon the top flange, a series of stackable, generally cylindrically-shaped, abrasion resistant cork elements axially mounted on the mounting rod extending between the top and bottom flanges, and the mounting rod being removable for allowing interchanging or replacement of the cork elements.

13 Claims, 6 Drawing Figures

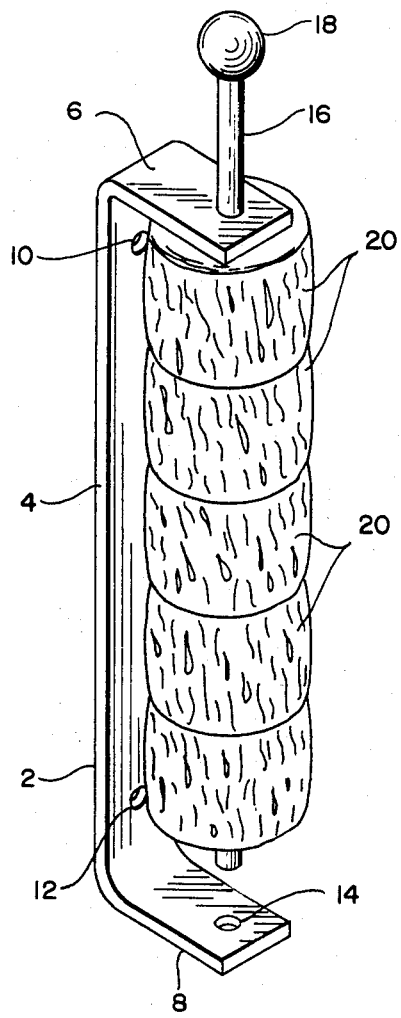
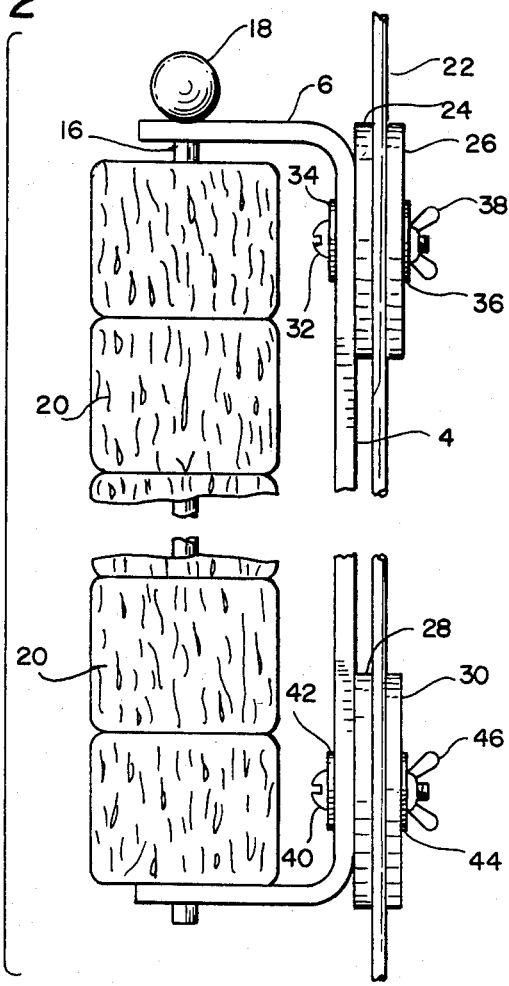
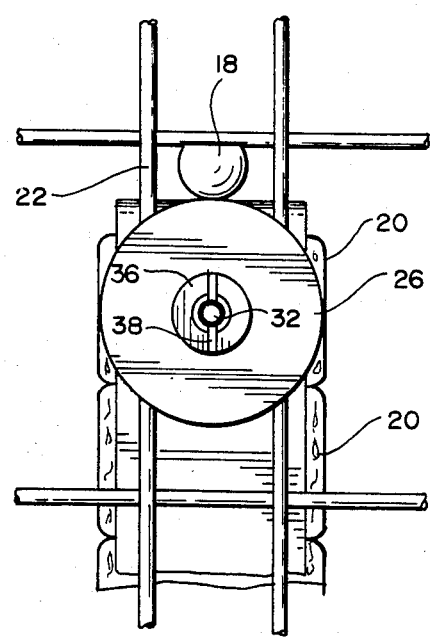

CAT SCRATCHING POST AND DOOR HANGING ASSEMBLY

FIELD OF THE INVENTION

This invention relates to scratching posts for cats and more particularly to a cat scratching post including a plurality of vertically stacked, cylindrically-shaped cork elements which are readily interchangeable or replaceable after extended use. A number of embodiments are disclosed allowing the scratching post assembly to be mounted onto various supporting structures.

BACKGROUND OF THE INVENTION

It has long been observed that cats frequently exercise and sharpen their claws by scratching stationary objects especially articles of furniture, draperies and carpeting which may be damaged or destroyed by such activity. To deter this behavior, many cat owners have provided scratching posts as alternative scratching surfaces for their pets.

Wood has often been used in the construction of scratching posts, however, wood is subject to splintering or slivering which may be harmful to the cat. As an alternative to the use of wood, many scratching posts are now covered with carpeting material as shown by Salerno, U.S. Pat. No. 3,604,397; Bryson, U.S. Pat. No. 2,997,019; Goldson, U.S. Pat. No. 2,894,487 and Helmer, U.S. Pat. No. 3,085,551. The cat scratcher of Helmer is intended to be mounted on a door, while the other scratching posts are floor mounted.

While it is desirable to prevent the cat from destroying expensive upholstery or carpeting, pile covered scratching posts of the type identified above only serve to reinforce this destructive behavior.

Another scratching post assembly is disclosed by Mullin, U.S. Pat. No. 3,993,027 wherein the scratching post consists of a plurality of vertically stacked corrugated cardboard sheets. A major disadvantage of this device is that cardboard is easily shredded and mutilated by the cat's claws thereby necessitating frequent replacement thereof.

It would therefore be desirable to provide a scratching post assembly from materials other than those referred to above yet which would still be attractive to a cat. Furthermore, it would be desirable to provide a scratching post assembly which is versatile in construction so as to be readily mounted upon a variety of supporting structures, for example, doors, walls and cages.

SUMMARY AND OBJECTS OF THE INVENTION

The present invention eliminates the problems associated with the prior art by providing a rugged, versatile cat scratching post assembly comprising a generally C-shaped mounting bracket having upper and lower flanges, a removable mounting rod extending between the upper and lower flanges for supporting in stacked relationship a plurality of cylindrically-shaped cork elements.

The use of cork provides several advantages over other previously used materials. In particular, cork is lightweight thus reducing the overall weight of the assembly, yet, cork is dense in nature, thus allowing it to be readily shaped into objects having a high degree of structural integrity and strength. In addition, the feel of cork has been found to be highly appealing to cats. Finally, cork will not splinter or form potentially harmful slivers as opposed to other forms of wood.

It is therefor an object of the present invention to provide a cat scratching post assembly which is rugged yet lightweight.

Another object of the present invention is to provide a scratching post assembly which includes a plurality of interchangeable and replaceable cylindrically-shaped cork elements.

A further object of the present invention is to provide a scratching post assembly which may be readily mounted to a wall, door or cage.

Still another object of the present invention is to provide a scratching post assembly which is inexpensive to manufacture and easy to assemble.

BRIEF DESCRIPTION OF THE DRAWINGS

The foregoing and other objects and advantages of this invention will appear from the following detailed description, taken in connection with the accompanying drawings, in which:

FIG. 1 is a perspective view of the scratching post assembly of the present invention in a partially disassembled condition;

FIG. 2 is a side elevational view with portions broken away showing an alternative mounting arrangement for the scratching post assembly;

FIG. 3 is a plan view showing a portion of the assembly of FIG. 2 as viewed from the rear;

DETAILED DESCRIPTION OF THE DRAWINGS

FIG. 1

Figure 4:
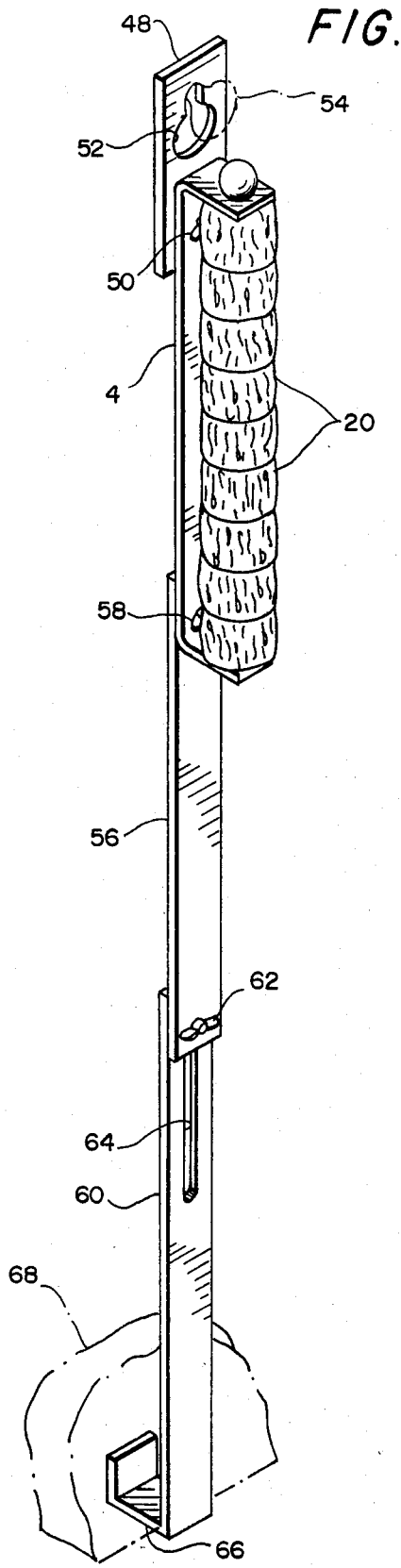
FIG. 4 is a perspective view of an alternative embodiment of the scratching post assembly as mounted on a door.

FIG. 1 shows scratching post assembly A comprising a generally C-shaped mounting bracket 2 having a longitudinally extending main body portion 4 and a top flange 6 and bottom flange 8 extending at approximately right angles from main body portion 4. Main body portion 4 includes a pair of apertures 10 and 12 formed therein for receiving mounting screws (not shown). Bottom flange 8 is provided with an aperture 14 while top flange 6 is provided with a corresponding aperture for receiving a mounting rod 16. One end of mounting rod 16 is provided with a stop element 18 which ultimately rests upon top flange 6 after assembly of the unit is completed. A series of generally cylindrically-shaped cork elements 20 having a central axial passage are axially mounted in stacked readily removable relation upon mounting rod 16 which extends through the successive axial passages in free-sliding engagement spanning the distance between top flange 6 and bottom flange 8.

In use, scratching post assembly A would be vertically mounted on a wall at a height chosen so as to allow the assembly to be readily accessible to the pet. Mounting of the assembly would be achieved through the use of screws cooperating with apertures 10 and 12 so that the rear surface of main body portion 4 would be anchored flush against the wall surface. After an extended period of use, some of the cork elements may be subjected to greater wear than others and may need to be replaced or relocated on mounting rod 16. Removal may be easily achieved by simply raising mounting rod 16 and sliding elements 20 from the free end thereof.

FIGS. 2 and 3

In FIGS. 2 and 3, the scratching post assembly is shown as being mounted in the interior of a pet cage constructed from cage bars 22. Securement to bars 22 is achieved by the use of annular wedging disks 24, 26, 28 and 30. Disks 24, and 26 are mounted upon bolt 32 extending through opening 10 in main body portion 4 of the mounting bracket. The head of bolt 32 is spaced from main body portion 4 by means of washer 34. Disks 24 and 26 include opposed planar faces which engage bars 22 positioned therebetween. A second washer 36 is mounted on bolt 32 adjacent to annular disk 26. Clamping pressure is applied by tightening locking nut 38 so that it abuts against washer 36.

Annular disks 28 and 30 provide a similar bar clamping function adding additional stability to the mounting of the scratching post assembly. Bolt 40, washer 42, washer 44 and locking nut 46 are arranged in the same manner as their corresponding counterparts as previously described.

The bar mounting arrangement allows the scratching post assembly to be supported within almost any type of cage without causing damage thereto. The cage mounting assembly is especially useful whenever a cat is confined to a cage over an extended period of time. Breeders, pet shop owners and veterinarians may benefit greatly from this arrangement.

Since the scratching post assembly of FIGS. 2 and 3 is secured to the side of the cage as opposed to the cage bottom, it does not take up walking space and is not prone to soiling.

Figure 6:
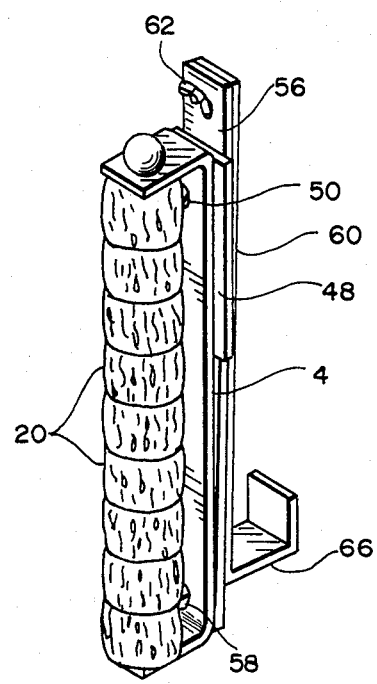
FIG. 6 is a perspective view showing an alternative arrangement of the scratching post and door mounting assembly of FIG. 4.
Figure 5:
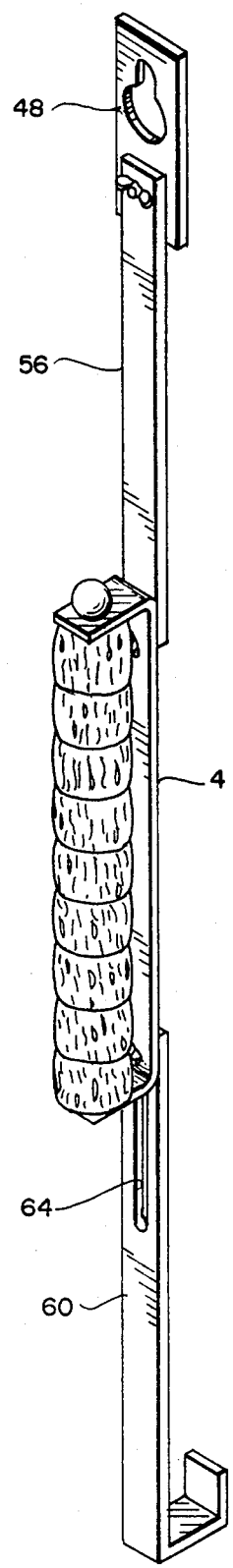
FIG. 5 is a perspective view of the assembly of FIG. 4 shown in the folded position.

FIGS. 4, 5 and 6

FIG. 4 shows a door mounting arrangement for the scratching post assembly. This embodiment includes a door knob engaging mounting bracket 48 which is pivotally secured to the rear of main body portion 4 by means of a bolt and locking nut arrangement generally indicated by numeral 50. Bracket 48 includes a generally pear-shaped opening 52 for receiving door knob 54. An extension bracket 56 is pivotally secured to the rear of main body portion 4 by means of bolt and locking nut arrangement 58. A door bottom engaging bracket 60 is attached to extension bracket 56 by bolt and nut arrangement 62. Bracket 60 includes a longitudinally extending slot 64 allowing height adjustment to occur. Bracket 60 further includes a generally J-shaped base portion 66 for engaging door bottom 68. While not shown, each bolt and nut combination 50, 58 and 62 may include a rubber grommet covering the bolt head in order to prevent marring of the door finish.

The door mounting assembly is especially advantageous in that it may be used in motels or other places where permanent installation is not practical. The assembly is easily installed in seconds, requires no tools and converts any door to a sturdy base for the scratching post. In addition, installation of the door mounting assembly does not cause any damage to the supporting structure since no mounting screws are required.

FIG. 5 shows the door mounting assembly of FIG. 4 folded up for travelling or storage purposes. It may be seen that when the door mounting assembly is folded up, it assumes a compact form which allows it to be easily fitted into a suitcase or cat carrier.

FIG. 6 shows an alternative arrangement of the door mounting assembly components. In this instance, door bottom engaging bracket 60 is attached directly to main body portion 4. In addition, mounting bracket 48 is pivotally attached to extension bracket 56 which in turn is pivotally connected to main body portion 4. With this arrangement, the height of the scratching post will be more suitable for smaller cats or kittens. The interchanging of the parts still allows the assembly to be folded up into a compact form for travelling.

Each of the brackets 4, 48, 56 and 60 are preferably constructed of durable, lightweight, acrylic plastic. The scratching post assembly is unique and versatile in that it allows for a variety of different mounting arrangements.

While this invention has been described in connection with different embodiments thereof, it will be understood that it is capable of further modifications, and this application is intended to cover any variations, uses, or adaptations of the invention following, in general, the principals of the inventions and including such departures from the present disclosure as come within known or customary practice in the art to which the invention pertains, and as may be applied to the essential features hereinbefore set forth and followed in the scope of the invention or the limits of the appended claims.

I claim:
1. A scratching post assembly for pets, comprising:
    (a) a generally C-shaped mounting bracket including a longitudinally extending main body portion and top and bottom flanges extending at approximately right angles from said main body portion,
    (b) mounting means associated with said main body portion for mounting said main body portion onto a supporting structure,
    (c) said top and said bottom flanges each including an aperture formed therein,
    (d) an elongated mounting rod including a stop element attached to one end thereof, said mounting rod extending through said flange apertures and said stop element resting upon said top flange,
    (e) a series of stackable, generally cylindrically-shaped, cork elements having a central axial passage axially mounted on said mounting rod and extending between said top and said bottom flanges, and
    (f) said mounting rod extending through the central axial passage in the cork elements in free sliding engagement and being readily removable allowing interchanging or replacement of said cork elements.
2. A scratching post assembly as in claim 1, and wherein:
    (a) said mounting means including at least one aperture formed in said main body portion, and
    (b) an anchoring screw extending through said aperture for mounting said main body portion onto a wall or other planar surface.
3. A scratching post assembly as in claim 1, and wherein:
    (a) said mounting means including at least one aperture formed in said main body portion,
    (b) an anchoring bolt extending through said aperture,
    (c) a pair of annular disks mounted on said bolt at the rear of said main body portion,

(d) said annular disks having opposed faces for engaging and clamping onto the bars of a pet cage, and
(e) a locking nut threaded onto the end of said bolt allowing clamping pressure to be applied to said bars by said opposed faces of said annular disks.

4. A scratching post assembly as in claim 1, and wherein:
(a) said mounting means including a door knob engaging mounting bracket and a door bottom engaging mounting bracket,
(b) said door knob engaging mounting bracket and said door bottom engaging mounting bracket being connected to the rear of said main body portion allowing said main body portion to be mounted on a door and suspended between the door knob and the door bottom.

5. A scratching post assembly as in claim 4, and wherein:
(a) said door base engaging bracket being length adjustable.

6. A scratching post assembly as in claim 4, and wherein:
(a) said door base engaging bracket includes a generally J-shaped base portion for engaging the door bottom.

7. A scratching post assembly as in claim 4, and wherein:
(a) said door knob engaging mounting bracket includes a door knob receiving aperture formed therein.

8. A scratching post assembly as in claim 4, and wherein:
(a) said door knob engaging mounting bracket and said door bottom engaging mounting bracket being pivotally connected to said main body portion allowing said scratching post assembly to be folded into a compact form when not in use.

9. A cat scratching post assembly, comprising:
(a) support means,
(b) an elongated mounting rod supported by said support means at two longitudinally spaced points and from which it is readily retracted,
(c) a series of stackable, generally cylindrically-shaped cork elements each having a central axial passage along which they are axially mounted upon said mounting rod in free sliding engagement,
(d) said cylindrically-shaped elements being readily removable from the mounting rod and interchangeably re-positioned upon said mounting rod, said support means extending between said two spaced points.

10. A cat scratching post assembly as in claim 9 and wherein:
(a) said support means being wall mountable.

11. A cat scratching post assembly as in claim 9 and wherein:
(a) said support means being door mountable.

12. A cat scratching post assembly as in claim 9 and wherein:
(a) said support means being cage mountable.

13. A cat scratching post assembly as in claim 9 and wherein:
(a) said support means including a bracket assembly.

* * * * *